(12) United States Patent
Tamanuki et al.

(10) Patent No.: US 10,933,651 B2
(45) Date of Patent: Mar. 2, 2021

(54) INKJET RECORDING METHOD AND INKJET RECORDING APPARATUS

(71) Applicant: CANON KABUSHIKI KAISHA, Tokyo (JP)

(72) Inventors: Yukako Tamanuki, Tokyo (JP); Shinsuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/256,158

(22) Filed: Jan. 24, 2019

(65) Prior Publication Data

US 2019/0232674 A1 Aug. 1, 2019

(30) Foreign Application Priority Data

Jan. 31, 2018 (JP) .............................. JP2018-015198

(51) Int. Cl.
*B41J 2/18* (2006.01)
*B41M 5/00* (2006.01)
*C09D 11/322* (2014.01)
*C09D 11/30* (2014.01)

(52) U.S. Cl.
CPC .............. *B41J 2/18* (2013.01); *B41M 5/0023* (2013.01); *B41J 2202/12* (2013.01); *C09D 11/30* (2013.01); *C09D 11/322* (2013.01)

(58) Field of Classification Search
CPC .... B41J 2202/08; B41J 2202/12; B41J 2/175; B41J 2/17556; B41J 2/17596
See application file for complete search history.

(56) References Cited

U.S. PATENT DOCUMENTS

| 4,130,126 A | 12/1978 | Chocholaty et al. |
| 6,561,637 B2 * | 5/2003 | Hino ........................ B41J 2/175 347/92 |
| 7,357,832 B2 | 4/2008 | Kato et al. |

(Continued)

FOREIGN PATENT DOCUMENTS

| CN | 1690134 A | 11/2005 |
| CN | 1955232 A | 5/2007 |

(Continued)

OTHER PUBLICATIONS

May 28, 2019 extended European Search Report in European Patent Appln. No. 19154104.4.

(Continued)

*Primary Examiner* — John Zimmermann
(74) *Attorney, Agent, or Firm* — Venable LLP

(57) ABSTRACT

Inkjet recording is performed by using an inkjet recording apparatus including an ink circulation channel for circulating a first ink, an ink supply channel for supplying a second ink into the ink circulation channel, and a recording head communicating with the ink circulation channel. The apparatus is configured to eject an aqueous ink including the first ink and the second ink from the recording head, thereby recording an image on a recording medium. The content (% by mass) of water in the first ink and the content (% by mass) of water in the second ink differ from each other by 2.00% by mass or more. The first ink contains a pigment, and the second ink contains a first water-soluble organic solvent having a log P value of −1.10 or more and a surfactant.

16 Claims, 1 Drawing Sheet

(56) References Cited

U.S. PATENT DOCUMENTS

| | | | |
|---|---|---|---|
| 8,367,750 B2 | 2/2013 | Moribe et al. | |
| 9,352,555 B2* | 5/2016 | Takahashi | B41J 2/04563 |
| 9,475,304 B2* | 10/2016 | Sugitani | B41J 2/18 |
| 10,557,048 B2 | 2/2020 | Oriakhi et al. | |
| 2010/0075050 A1 | 3/2010 | Tojo et al. | |
| 2012/0105520 A1* | 5/2012 | Shimoda | B41J 2/175 347/6 |
| 2012/0113193 A1* | 5/2012 | Yamashita | C09D 11/322 347/56 |
| 2014/0168306 A1* | 6/2014 | Bansyo | B41J 2/14072 347/15 |
| 2016/0032118 A1* | 2/2016 | Morris | C09D 11/30 428/207 |
| 2016/0032119 A1* | 2/2016 | Morris | C09C 1/48 428/207 |
| 2017/0165979 A1 | 6/2017 | Ohta | |
| 2018/0154630 A1* | 6/2018 | Takahashi | B41J 2/04586 |
| 2018/0237651 A1* | 8/2018 | Oriakhi | B41J 2/18 |
| 2018/0273786 A1 | 9/2018 | Nushiro et al. | |
| 2018/0305863 A1* | 10/2018 | Dimotakis | C09B 67/0013 |

FOREIGN PATENT DOCUMENTS

| | | |
|---|---|---|
| CN | 107001832 A | 8/2017 |
| JP | 2003-326692 A | 11/2003 |
| JP | 2010-077259 A | 4/2010 |
| WO | 2016/092310 A1 | 6/2016 |

OTHER PUBLICATIONS

European Office Action issued in corresponding European Application No. 19154104.4 dated Apr. 16, 2020.

Chinese Office Action issued in corresponding Chinese Application No. 201910092520.2 dated Dec. 2, 2020.

* cited by examiner

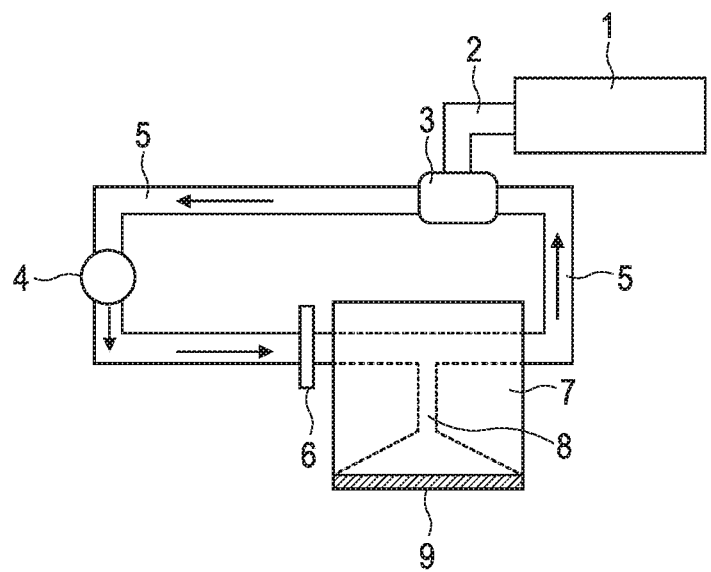

INKJET RECORDING METHOD AND INKJET RECORDING APPARATUS

BACKGROUND OF THE INVENTION

Field of the Invention

The present invention relates to an inkjet recording method and an inkjet recording apparatus.

Description of the Related Art

In recent years, opportunities of using an inkjet recording apparatus in a commercial printing field and in an office printing field have been increasing. Reducing the number of recovery actions such as preliminary ejection is required for an inkjet recording apparatus to be used in the commercial printing field and in the office printing field in order to record an image at a high speed. The preliminary ejection is performed for suppressing deterioration of ejection properties due to an increase in viscosity of an ink at an ejection orifice having a low frequency of ink ejection and is one of the processes for recovering an ejection orifice. It is known that an ink is circulated in an ink circulation channel including a recording head in order to suppress the deterioration of ejection properties due to an increase in viscosity of the ink at an ejection orifice having a low frequency of ink ejection (see Japanese Patent Application Laid-Open No. 2010-77259).

SUMMARY OF THE INVENTION

The present inventors have recorded images over a long period of time using an inkjet recording apparatus which can circulate an ink in an ink circulation channel including a recording head as described in Japanese Patent Application Laid-Open No. 2010-77259. As a result, it has been found that density unevenness occurs in the images in some cases.

Accordingly, an object of the present invention is to provide an inkjet recording method by which image density unevenness can be suppressed even in a case where images are recorded over a long period of time. In addition, another object of the present invention is to provide an inkjet recording apparatus using the inkjet recording method.

The present invention provides an inkjet recording method which includes ejecting an aqueous ink using an inkjet recording apparatus including an ink circulation channel in which a first ink circulates, an ink supply channel supplying a second ink into the ink circulation channel, and a recording head communicating with the ink circulation channel, the inkjet recording apparatus being configured to eject the aqueous ink including the first ink and the second ink from the recording head, thereby recording an image on a recording medium, wherein a difference between a content (% by mass) of water in the first ink and a content (% by mass) of water in the second ink is 2.00% by mass or more, the first ink contains a pigment, and the second ink contains a first water-soluble organic solvent having a log P value of −1.10 or more and a surfactant.

In addition, the present invention provides an inkjet recording apparatus including an ink circulation channel for circulating a first ink, an ink supply channel for supplying a second ink into the ink circulation channel, and a recording head communicating with the ink circulation channel, the apparatus being configured to eject an aqueous ink including the first ink and the second ink from the recording head, wherein a difference between a content (% by mass) of water in the first ink and a content (% by mass) of water in the second ink is 2.00% by mass or more, the first ink contains a pigment, and the second ink contains a first water-soluble organic solvent having a log P value of −1.10 or more and a surfactant.

According to the present invention, an inkjet recording method and an inkjet recording apparatus by which image density unevenness can be suppressed even in a case where images are recorded over a long period of time are provided.

Further features of the present invention will become apparent from the following description of exemplary embodiments with reference to the attached drawing.

BRIEF DESCRIPTION OF THE DRAWINGS

FIGURE is a schematic diagram illustrating one example of an inkjet recording apparatus which can circulate an ink in an ink circulation channel including a recording head.

DESCRIPTION OF THE EMBODIMENTS

Preferred embodiments of the present invention will now be described in detail in accordance with the accompanying drawing.

Hereinafter, embodiments of the present invention will be described in detail. In the present invention, an aqueous ink may be hereinafter referred to as "ink". Various physical property values are those at a temperature of 25° C. unless otherwise noted. The terms "(meth)acrylic acid" and "(meth)acrylate", when occurring in the description, represent "acrylic acid or methacrylic acid" and "acrylate or methacrylate" respectively. Any of the first ink and the second ink is an aqueous ink.

An inkjet recording apparatus includes an ink circulation channel for circulating an ink, an ink supply channel for supplying an ink into the ink circulation channel, and a recording head communicating with the ink circulation channel. Thereby, the ink in the ink circulation channel including the recording head can be circulated. When images are recorded over a long period of time using this inkjet recording apparatus, the ink circulates in the ink circulation channel over a long period of time. Therefore, water in the circulating ink gradually evaporates from an ejection orifice and the like. Thereby, the content of water in the ink gradually becomes lower in the circulating ink than in an ink to be newly supplied into the ink circulation channel, thus the circulating ink being concentrated. Accordingly, inks having different contents of water exist in the ink circulation channel and the ink supply channel in the inkjet recording apparatus. In the present invention, the ink which is circulating in the ink circulation channel is referred to as the first ink, and the ink to be supplied into the ink circulation channel is referred to as the second ink.

As a result of studies conducted by the present inventors, it has been found that in a case where a first ink and a second ink having different contents of water exist in an ink circulation channel and an ink supply channel respectively in an inkjet recording apparatus, density unevenness occurs in a recorded image. Particularly in a case where the difference between the content of water in the first ink and the content of water in the second ink is 2.00% by mass or more, the problem of image density unevenness remarkably occurs. Further, also in a case where the first ink contains a pigment, the problem of image density unevenness remarkably occurs. The reason is explained in the below. It is to be noted, meanwhile, that the difference in the content of water between the first ink and the second ink can be determined by measuring the content of water in each ink by a Karl Fischer method.

When the first ink circulates over a long period of time, water contained therein evaporates from an ejection orifice and the like, and the content of water in the ink thereby becomes lower, thus the first ink being concentrated. On the other hand, the second ink to be supplied into the ink circulation channel, unlike the first ink which is circulating, is not concentrated. The first ink which is concentrated and the second ink which is not concentrated are not easily mixed with each other, and therefore if an ink in a state where the first ink and the second ink have not sufficiently been mixed is ejected from a recording head, density unevenness will occur in a recorded image. Particularly in a case where the first ink contains a pigment, if the content of water in the ink becomes low, pigment particles in the ink easily get close to each other and aggregate. Therefore, when the ink is ejected from a recording head in a state where the first ink and the second ink have not sufficiently been mixed with each other, image densities will significantly differ between a region where such aggregates of pigment particles adhere and a region where such aggregates of pigment particles do not adhere, so that density unevenness in a recorded image can easily be recognized.

Thus, the present inventors allow the second ink to contain a first water-soluble organic solvent having a log P value of −1.10 or more and a surfactant in order to suppress the image density unevenness which occurs due to the difficulty in sufficiently mixing the first ink which is concentrated and the second ink which is not concentrated. Explanation more in detail follows.

The log P value is an index showing the polarity of a water-soluble organic solvent. When this value is large, the polarity is low, and when this value is small, the polarity is high. As the first water-soluble organic solvent has a log P value of −1.10 or more, it has a (relatively) high hydrophobicity and therefore has a high affinity with the pigment. Accordingly, the first water-soluble organic solvent in the second ink gets close to an aggregate of pigment particles in the first ink and allows the first ink and the second ink to be mixed easily. In addition, as the ink is circulated, shear force is thereby applied to the ink to disentangle the aggregate of pigment particles in the first ink and allows the pigment particles to move easily. Further, when the first water-soluble organic solvent in the second ink gets close to the aggregate of pigment particles and diffuses there due to the circulation of the ink, the aggregate of pigment particles is disentangled still easily so that the pigment particles are allowed to move together with the first water-soluble organic solvent.

Generally, a surfactant has a hydrophobic moiety having a high affinity with a pigment and also has a hydrophilic moiety having a high affinity with water. As the second ink further contains a surfactant, pigment particles can be quickly dispersed, and the first ink and the second ink can be mixed more easily. In this way, the aggregate of pigment particles in the first ink is quickly dispersed by the action of the first water-soluble organic solvent and the surfactant in the second ink, so that the first ink and the second ink may be easily mixed with each other, whereby the image density unevenness is effectively suppressed.

<Inkjet Recording Method>

An inkjet recording method according to the present invention records an image on a recording medium by ejecting an ink from a recording head. Examples of a system of ejecting an ink include a system of imparting mechanical energy to an ink and a system of imparting thermal energy to an ink. In the present invention, the system of imparting thermal energy to an ink, thereby ejecting the ink can preferably be adopted.

<Inkjet Recording Apparatus>

As the recording head, a serial type recording head (serial head) and a line type recording head (line head) can be used. Among others, in the present invention, a line head can advantageously be adopted. A line head has ejection orifices for ejecting an ink which are disposed over the whole width of a recording medium and therefore can perform image recording at a high speed.

FIGURE is a schematic diagram illustrating one example of an inkjet recording apparatus which can circulate an ink in an ink circulation channel including a recording head. Both a main tank 1 and a sub-tank 3 have a function as an ink storage section. An ink fed from the main tank 1 to the sub-tank 3 through an ink supply channel 2 flows through an ink circulation channel 5 in the direction indicated by arrows in the FIGURE by a circulation pump 4 as a unit of circulating the ink and is fed to a recording head 7 via a filter 6. In a case where the ink is ejected from the recording head 7 based on image data, the ink flows through an ink flow channel 8 in the recording head 7, and an image is recorded on a recording medium (not shown in the FIGURE) by ejecting the ink from the ejection orifices formed at an ejection orifice face 9. In addition, the ink may also be discharged from the recording head 7 based on a preliminary ejection data. The ink not discharged outside the apparatus for the purpose of image recording, preliminary ejection, or the like comes back in the ink circulation channel 5 again to be fed to the sub-tank 3. In this way, when the ink circulates between the sub-tank 3 and the recording head 7, the ink in the ink circulation channel including the recording head can be circulated. The flow speed (flow rate) during circulation may be appropriately decided according to the constitution of the apparatus, and is preferably set to 1 to 50 mL/min, and more preferably 1 to 10 mL/min, for example.

The mass (g) of the ink which can be stored in the main tank can be 80 g or more to 600 g or less. The mass (g) of the ink in the other parts of the apparatus which include the recording head and the ink circulation channel can be 140 g or more to 150 g or less.

In a case where preliminary heating is performed prior to recording based on image data, water in the ink is particularly liable to evaporate from an ejection orifice and the like, and the difference in the content of water between the first ink and the second ink is liable to become large in the ink circulation channel and the ink supply channel in the inkjet recording apparatus. The preliminary heating is a heating operation by means of a heating element or elements disposed in the vicinity of a recording element for ejecting an ink. The temperature (° C.) of the ink ejected from the recording head is preferably 40° C. or more to 45° C. or less.

Further, in a case where deaeration is performed while the ink is circulated in the ink circulation channel, water in the ink is particularly liable to evaporate from an ejection orifice and the like, and the difference in the content of water between the first ink and the second ink is liable to become large in the ink circulation channel and the ink supply channel in the ink jet recording apparatus. Examples of the method of deaerating the ink in the inkjet recording apparatus include a method of reducing pressure in an ink storage section. Examples of the method of reducing pressure in the ink storage section include a method of reducing pressure in the main tank or the sub-tank and a method in which an ink storage section other than the main tank and the sub-tank is provided in the ink circulation channel and the pressure of the ink storage section is reduced. The ink in the ink storage section may be stirred using a stirrer or the like, or the ink storage section may be vibrated in order to increase the surface area of liquid and make air bubbles to be easily removed. Among others, the method of deaerating the ink is preferably a method of reducing pressure in the sub-tank, and more preferably a method of reducing pressure by a deaeration pump connected to the sub-tank.

<Ink>

The first ink contains a pigment. The second ink contains a first water-soluble organic solvent having a log P value of −1.10 or more and a surfactant.

The first ink is usually a concentrated ink having a lower content of water than the second ink. The first ink and the second ink may have almost the same components other than water. That is, both the first ink and the second ink may contain a pigment, a first water-soluble organic solvent and a surfactant. Further, the contents of components other than water in the first ink and in the second ink can be almost the same, and the difference in each content of the components other than water between the first ink and the second ink can be ±0.50% or less. Particularly, when the first ink contains the first water-soluble organic solvent and the surfactant, aggregation of pigment particles in the first ink, which is circulating in the ink circulation channel, can be thereby prevented, and the first ink and the second ink, which is to be supplied to the circulation channel, can be mixed easily, whereby the image density unevenness can be effectively suppressed.

Hereinafter, while the contents and the ratios of respective components in the ink will be described, those values are for the second ink, which is not concentrated. Since the contents of components other than water are almost the same in the first ink and the second ink, the preferred ranges of the contents and the ratios of components other than water are almost the same in the first ink and the second ink.

(Pigment)

The ink contains a pigment. Specific examples of the pigment include: inorganic pigments such as carbon black and titanium oxide; and organic pigments such as azo, phthalocyanine, quinacridone, isoindolinone, imidazolone, diketopyrrolopyrrole and dioxazine pigments.

As a pigment dispersion system, a resin-dispersed pigment using a resin as a dispersant and a self-dispersible pigment having a hydrophilic group bonded to the surface of pigment particles can be used. In addition, a resin-bonded type pigment obtained by chemically bonding an organic group containing a resin to the surface of pigment particles, a microcapsule pigment obtained by covering the surface of pigment particles with a resin or the like, etc. can be used. Plural pigments obtained by different dispersion methods can be used together.

The content of the pigment in the ink is preferably 0.10% by mass or more to 15.00% by mass or less, and more preferably 1.00% by mass or more to 11.00% by mass or less based on the total mass of the ink.

(Water-Soluble Organic Solvent)

The log P (log Pow) value used as an index showing the polarity of a water-soluble organic solvent will be described. The log P value refers to a partition coefficient between water and octanol (1-octanol). The log P value represents a physical property relating to how easily an object substance blends compatibly with water, and as this value becomes larger, the polarity becomes lower. The log P value is calculated in accordance with the definition $\log P = \log_{10} C_o / C_w$ ($C_o$ represents the concentration of the object substance in octanol phase and $C_w$ represents the concentration of the object substance in water phase). The log P value can also be obtained experimentally by the method described in JIS Z 7260-107. In addition, the log P value can also be obtained utilizing commercially available calculation software such as trade name "ACD/PhysChem Suite" (manufactured by ACD/Labs). In Examples, which will be described later, values obtained using trade name "ACD/PhysChem Suite Version 12.00" (manufactured by ACD/Labs) are adopted.

The term "water-soluble organic solvent" usually denotes a liquid, but in the present invention, a water-soluble organic substance which is solid at a temperature of 25° C. is also included in the water-soluble organic solvent. The water-soluble organic solvent to be contained in the ink can have a vapor pressure at 25° C. lower than the vapor pressure at 25° C. of water. Specific examples of the water-soluble organic solvent include the following compounds (numerical values in parentheses represent log P values). Polyethylene glycol having a number average molecular weight of 1,000 (−6.35), polyethylene glycol having a number average molecular weight of 400 (−2.82), polyethylene glycol having a number average molecular weight of 200 (−1.88), tetraethylene glycol (−1.88), bishydroxyethylsulfone (−1.86), glycerin (−1.85), urea (−1.66), triethylene glycol (−1.65), diethylene glycol (−1.41), 1,2,6-hexanetriol (−1.39), ethylene glycol (−1.36), ethylene urea (−1.24), 1,3-propanediol (−1.09), 2-pyrrolidone (−1.09), 1,2-propanediol (−1.01), trimethylolpropane (−0.97), 1,4-butanediol (−0.77), triethylene glycol monoethyl ether (−0.66), N-methyl-2-pyrrolidone (−0.64), γ-butyrolactone (−0.63), δ-valerolactam (−0.57), 1,5-pentanediol (−0.56), 3-methyl-1,5-pentanediol (−0.21), δ-valerolactone (−0.10), 1,6-hexanediol (−0.05), isopropanol (0.18), triethylene glycol monobutyl ether (0.36), 1,2-hexanediol (0.52), ethylene glycol monobutyl ether (0.83), 1-pentanol (1.35), 1,2-octanediol (1.54) and tripropylene glycol monobutyl ether (1.66) are given as examples.

[First Water-Soluble Organic Solvent]

The ink contains a first water-soluble organic solvent having a log P value of −1.10 or more. The log P value of the first water-soluble organic solvent is preferably 1.70 or less, and more preferably 0.60 or less.

Specific examples of the first water-soluble organic solvent include the following compounds (numerical values in parentheses represent log P values). 1,3-propanediol (−1.09), 2-pyrrolidone (−1.09), 1,2-propanediol (−1.01), trimethylolpropane (−0.97), 1,4-butanediol (−0.77), triethylene glycol monoethyl ether (−0.66), N-methyl-2-pyrrolidone (−0.64), γ-butyrolactone (−0.63), δ-valerolactam (−0.57), 1,5-pentanediol (−0.56), 3-methyl-1,5-pentanediol (−0.21), δ-valerolactone (−0.10), 1,6-hexanediol (−0.05), isopropanol (0.18), triethylene glycol monobutyl ether (0.36), 1,2-hexanediol (0.52), ethylene glycol monobutyl ether (0.83), 1-pentanol (1.35), 1,2-octanediol (1.54) and tripropylene glycol monobutyl ether (1.66) are given as examples.

Among others, the first water-soluble organic solvent can be at least one selected from the group consisting of alkane diols and glycol ethers. Among the water-soluble organic solvents, alkane diols and glycol ethers have a high penetrability. Therefore, alkane diols and glycol ethers easily get close to the aggregate of pigment particles and easily move between the first ink and the second ink, and therefore the first ink and the second ink are quickly mixed. Thereby, the image density unevenness can be more effectively suppressed.

In addition, from the viewpoint of water-solubility, the number of carbon atoms of an alkane diol can be 8 or less. When the number of carbon atoms exceeds 8, the alkane diol becomes sterically large, and therefore it becomes hard for the alkane diol to get close to the aggregate of pigment particles. Further, it becomes hard for the alkane diol to move between the first ink and the second ink, and therefore it is hard for the first ink and the second ink to be mixed quickly. Thereby, the image density unevenness cannot be suppressed sufficiently in some cases.

A glycol ether is represented by $R_3$—$(OR_4)_n$—OH. $R_3$ represents an alkyl group, and $R_4$ represents an alkylene group. The number of carbon atoms of $R_3$ can be 2 or more to 4 or less, the number of carbon atoms of $R_4$ can preferably be 2 or 3, and n can be 1 or more to 3 or less. When the glycol ether becomes sterically large, it becomes hard for the glycol ether to get close to the aggregate of pigment particles. Further, it becomes hard for the glycol ether to move between the first ink and the second ink, and therefore it is hard for the first ink and the second ink to be mixed quickly. Thereby, the image density unevenness cannot be suppressed sufficiently in some cases.

The content (% by mass) of the first water-soluble organic solvent in the ink can be 0.50% by mass or more to 15.00% by mass or less based on the total mass of the ink. When the content of the first water-soluble organic solvent is less than 0.50% by mass, it is hard for the first water-soluble organic solvent to get close to the aggregate of pigment particles, so that the image density unevenness cannot be suppressed sufficiently in some cases. When the content of the first water-soluble organic solvent exceeds 15.00% by mass, the amount of the first water-soluble organic solvent is large, and therefore the first water-soluble organic solvent having a high hydrophobicity adheres too much to the surface of pigment particles. Pigment particles are liable to aggregate by way of the first water-soluble organic solvent, and therefore the image density unevenness cannot be suppressed sufficiently in some cases.

The mass ratio (times) of the content (% by mass) of the first water-soluble organic solvent to the content (% by mass) of the pigment is preferably 0.10 times or more to 3.00 times or less, and more preferably 0.10 times or more to 2.50 times or less.

It is to be noted that when the ink contains a first water-soluble organic solvent having a log P value of −1.10 or more, a water-soluble organic solvent having a log P value of less than −1.10 can also be used together with the first water-soluble organic solvent. The proportion (%) of the content (% by mass) of the first water-soluble organic solvent in the content (% by mass) of all the water-soluble organic solvents in the ink can be 1.00% or more to 50.00% or less.

(Surfactant)

The ink contains a surfactant. As the surfactant, anionic surfactants, nonionic surfactants, cationic surfactants, amphoteric surfactants and the like can be used. Among others, the surfactant can be a nonionic surfactant from the viewpoint of the reliability of the ink.

Examples of the nonionic surfactant include hydrocarbon-based surfactants such as acetylene glycol-based surfactants and polyoxyethylene alkyl ether-based surfactants, fluorine-based surfactants such as perfluoroalkyl ethylene oxide adducts, and silicone-based surfactants such as polyether-modified siloxane compounds. Among others, the nonionic surfactant is preferably a hydrocarbon-based surfactant and is more preferably an acetylene glycol-based surfactant.

Among others, the surfactant can be a compound represented by the following formula (1). The compound represented by the following formula (1) is an acetylene glycol-based surfactant in the case of x+y=0.0 and is an ethylene oxide-added acetylene glycol-based surfactant in the case where x+y is more than 0.0 to 10.0 or less. The compound represented by the following formula (1) has a structure symmetrical to a triple bond between carbon and carbon and is excellent in balance between the hydrophilic moiety and the hydrophobic moiety, and therefore quickly orients to an interface, particularly to the surface of pigment particles. Therefore, it becomes easy for the first water-soluble organic solvent to get close to the aggregate of pigment particles, so that the surfactant quickly orients to the surface of pigment particles and thereby the pigment can be quickly dispersed. Thereby, it becomes easier for the first ink and the second ink to be mixed, so that the image density unevenness can be more effectively suppressed.

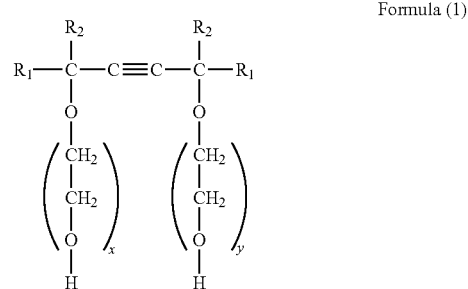

Formula (1)

where $R_1$ and $R_2$ each independently represent an alkyl group having 1 or more to 4 or less carbon atoms and x+y is 0.0 or more to 10.0 or less.

When $R_1$ and $R_2$ in formula (1) are each independently an alkyl group having 1 or more to 4 or less carbon atoms, the compound can be quickly oriented to the surface of a pigment particle. In formula (1), the number of carbon atoms of $R_1$ can be 4, and the number of carbon atoms of $R_2$ can be 1.

In formula (1), x+y is preferably 0.0 or more to 10.0 or less. When x+y exceeds 10.0, the amount of ethylene oxide groups in the compound is large, and therefore the hydrophilicity is enhanced, so that it is hard for compound to be quickly oriented to the surface of a pigment particle. Thereby, it becomes hard for the first ink and the second ink to be mixed, so that the image density unevenness cannot be suppressed sufficiently in some cases. In formula (1), x+y is more preferably 4.0 or more to 8.0 or less.

The content (% by mass) of the surfactant in the ink can be 0.10% by mass or more to 1.00% by mass or less based on the total mass of the ink. Further, the mass ratio (times) of the content (% by mass) of the surfactant to the content (% by mass) of the first water-soluble organic solvent can preferably be 0.03 times or more. When the mass ratio is less than 0.03 times, it is hard for the pigment to be dispersed in the ink, and therefore the image density unevenness cannot be suppressed sufficiently in some cases. The mass ratio is preferably 1.50 times or less, more preferably 1.00 times or less, and still more preferably 0.50 times or less.

The mass ratio (times) of the content (% by mass) of the surfactant to the content (% by mass) of the pigment is preferably 0.02 times or more and is more preferably 0.05 times or more to 0.20 times or less.

(Aqueous Medium)

The ink is an aqueous ink containing at least water as an aqueous medium. The aqueous medium may further contain a water-soluble organic solvent other than the first water-soluble organic solvent. As water, deionized water (ion-exchanged water) can be used. The water-soluble organic solvent is not particularly limited, and any of the water-soluble organic solvents which can be used for an inkjet ink, such as alcohols, glycols, glycol ethers and nitrogen-containing compounds which are other than the first water-soluble organic solvent, can be used. In addition, one or two or more of these water-soluble organic solvents can be contained in the ink.

The content (% by mass) of water in the ink can be 50.00% by mass or more to 95.00% by mass or less based on the total mass of the ink. In addition, the content (% by mass) of the water-soluble organic solvent in the ink can be 3.00% by mass or more to 50.00% by mass or less based on the total mass of the ink. When the content of the water-soluble organic solvent is less than 3.00% by mass, reliability such as sticking resistance is not obtained sufficiently in some cases where the ink is used for an inkjet recording apparatus. In addition, when the content of the water-soluble organic solvent exceeds 50.00% by mass, storage stability of the ink is not obtained sufficiently in some cases.

(Other Components)

If necessary, various additives such as a pH modifier, a defoaming agent, a rust-preventive agent, an antiseptic, an anti-mold agent, an antioxidant, an anti-reducing agent and a chelating agent may be contained in the ink. It is to be noted that the content of these additives in an ink is considerably low in general and an influence of these additives on the effect of the present invention is also small. Therefore, in the present invention, these additives are not included in the "water-soluble organic solvent" and do not correspond to the object of calculating the log P value.

(Physical Properties of Ink)

In the present invention, the ink preferably has a viscosity at 25° C. of 1.0 mPa·s or more to 5.0 mPa·s or less, and more preferably 1.0 mPa·s or more to 3.5 mPa·s or less. In addition, the ink can have a static surface tension at a temperature of 25° C. of 28.0 mN/m or more to 45.0 mN/m or less. Further, the ink can have a pH of 7.0 or more to 9.0 or less.

EXAMPLES

Hereinafter, the present invention will be described in more detail giving Examples and Comparative Examples, but the present invention is not limited to the following Examples within the range not exceeding the scope thereof. It is to be noted that "parts" and "%" described with respect to the amount of a component are each on a mass basis unless otherwise noted.

<Preparation of Pigment Dispersion Liquid>

(Pigment Dispersion Liquid 1)

To a solution obtained by dissolving 5.0 g of concentrated hydrochloric acid in 5.5 g of water, 1.6 g of 4-amino-1,2-benzene dicarboxylic acid was added at a temperature of 5° C. A solution obtained by dissolving 1.8 g of sodium nitrite in 9.0 g of water was added to the solution obtained above while the solution obtained above was stirred on an ice bath in order to keep a temperature of 10° C. or less. After the stirring was conducted for 15 minutes, 6.0 g of carbon black having a specific surface area of 220 $m^2$/g and having a DBP oil absorption of 105 mL/100 g was added thereto and mixed. After the stirring was further conducted for 15 minutes, a resultant slurry was subjected to filtration with filter paper (Standard Filter Paper No. 2, manufactured by ADVANTEC), and carbon black was sufficiently washed with water and was dried in an oven at a temperature of 110° C. Water was added to obtained carbon black to obtain a pigment dispersion liquid 1 having a content (solid content) of carbon black of 10.0%. In the pigment dispersion liquid 1, a self-dispersible pigment containing —$C_6H_3$—(COONa)$_2$ groups bonded to the surface of particles was contained. Thereafter, sodium ions were replaced with potassium ions using an ion exchange method.

(Pigment Dispersion Liquid 2)

20.0 g of a pigment, 8.0 mmol of a treatment agent, 8.0 mmol of nitric acid, and 200.0 mL of water were mixed. As the pigment, C.I. Pigment Yellow 74 (Hansa yellow 5GBX, manufactured by Clariant) was used, and as the treatment agent, p-aminophthalic acid was used. Mixing was conducted using a Silverson mixer under the conditions of a temperature of 25° C., 6,000 rpm and 30 minutes. An aqueous solution obtained by dissolving 8.0 mmol of potassium nitrite in a small amount of water was slowly added to a resultant mixture. The temperature of the mixture reached 60° C. by the addition of the aqueous solution. The mixture was reacted at a temperature of 60° C. for 1 hour. Thereafter, the pH of the mixture was adjusted to 10 using an aqueous solution containing 1.0 mol/L of potassium hydroxide. After 30 minutes, 20.0 mL of water was added to the mixture, and removal of low-molecular substances and desalting were performed using a Spectrum membrane. Further, the mixture was diluted with water to obtain a pigment dispersion liquid 2 (content of pigment of 10.0%) in which a self-dispersible pigment was contained. In the pigment dispersion liquid 2, a self-dispersible pigment containing —$C_6H_3$—(COOK)$_2$ groups bonded to the surface of particles was contained.

(Pigment Dispersion Liquid 3)

The amount of the treatment agent was changed to 4.0 mmol and the type of the pigment was changed to C.I. Pigment Red 122 (Ink Jet Magenta E 02, manufactured by BASF SE) in the preparation of the pigment dispersion liquid 2. A pigment dispersion liquid 3 (content of pigment of 10.0%) was obtained by the same procedure as in the preparation of the pigment dispersion liquid 2 except for the changes. In the pigment dispersion liquid 3, a self-dispersible pigment containing —$C_6H_3$—(COOK)$_2$ groups bonded to the surface of particles was contained.

(Pigment Dispersion Liquid 4)

The amount of the treatment agent was changed to 1.6 mmol and the type of the pigment was changed to C.I. Pigment Blue 15:3 (Hostaperm Blue B2G, manufactured by Clariant) in the preparation of the pigment dispersion liquid 2. A pigment dispersion liquid 4 (content of pigment of 10.0%) was obtained by the same procedure as in the preparation of the pigment dispersion liquid 2 except for the changes. In the pigment dispersion liquid 4, a self-dispersible pigment containing —$C_6H_3$—(COOK)$_2$ groups bonded to the surface of particles was contained.

(Pigment Dispersion Liquid 5)

10.0 parts of a pigment, 15.0 parts of a resin-containing liquid, and 75.0 parts of ion-exchanged water were mixed. As the pigment, carbon black was used. As the resin-containing liquid, a liquid having a content of the resin of 20.0%, the liquid obtained by neutralizing a styrene-ethyl acrylate-acrylic acid copolymer with an aqueous solution containing potassium hydroxide in an equimolar amount to the acid value of the copolymer, was used. The styrene-ethyl acrylate-acrylic acid copolymer has an acid value of 150 mgKOH/g and has a weight average molecular weight of 8,000. This mixture was dispersed for 5 hours, while being cooled with water, using a batch type vertical sand mill (manufactured by Aimex Co., Ltd.) in which 200.0 parts of zirconia beads having a particle diameter of 0.3 mm were filled. Thereafter, this dispersion liquid was subjected to a centrifugal separation treatment to remove coarse particles and was subjected to pressure filtration with a cellulose acetate filter (manufactured by ADVANTEC) having a pore size of 3.0 μm. A pigment dispersion liquid 5 (content of pigment of 10.0% and content of resin of 3.0%) in a state in which the pigment is dispersed in water by the resin was obtained by the above-described method.

<Preparation of Ink>

Respective components described in Tables 2 to 4 were mixed. On that occasion, the nonionic surfactants described in Table 1 were used. After stirring was conducted sufficiently, a resultant mixture was subjected to pressure filtration with a filter having a pore size of 1.2 μm to obtain an ink. The numerical values shown in parentheses in Tables 2 to 4 are log P values. In addition, inks 1 to 31 after being prepared are unconcentrated inks (second inks) and are denoted as the second inks 1 to 31 respectively.

TABLE 1

Type of nonionic surfactant

| | Trade name | Manufacturer | Formula | $R_1$ | $R_2$ | x + y |
|---|---|---|---|---|---|---|
| Hydrocarbon-based | ACETYLENOL E60 | Manufactured by Kawaken Fine Chemicals Co., Ltd. | (1) | $(CH_3)_2CHCH_2$ | $CH_3$ | 6.0 |
| | ACETYLENOL E100 | Manufactured by Kawaken Fine Chemicals Co., Ltd. | (1) | $(CH_3)_2CHCH_2$ | $CH_3$ | 10.0 |
| | Surfynol 104 | Manufactured by Nissin Chemical Industry Co., Ltd. | (1) | $(CH_3)_2CHCH_2$ | $CH_3$ | 0.0 |
| | Surfynol 82 | Manufactured by Nissin Chemical Industry Co., Ltd. | (1) | $CH_3CH_2$ | $CH_3$ | 0.0 |
| Fluorine-based | Zonyl FS-3100 | Manufactured by E.I. du Pont de Nemours and Company | — | — | — | — |
| Silicone-based | BYK-348 | Manufactured by BYK-Chemie GmbH | — | — | — | — |

TABLE 2

Composition and properties of ink

| | Ink No. | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 50.00 | | | | | 50.00 | 50.00 | 50.00 | 50.00 | 50.00 | 50.00 |
| Pigment dispersion liquid 2 | | 50.00 | | | | | | | | | |
| Pigment dispersion liquid 3 | | | 50.00 | | | | | | | | |
| Pigment dispersion liquid 4 | | | | 50.00 | | | | | | | |
| Pigment dispersion liquid 5 | | | | | 50.00 | | | | | | |
| 1,2-Hexanediol (0.52) | 3.00 | 3.00 | 3.00 | 3.00 | 3.00 | 1.50 | | | | | |
| 1,3-Propanediol (−1.09) | | | | | | | | 3.00 | | | |
| 1,2-Octanediol (1.54) | | | | | | | | | 1.00 | | |
| 3-Methyl-1,5-pentanediol (−0.21) | | | | | | | | | | 3.00 | |
| Ethylene glycol monobutyl ether (0.83) | | | | | | 1.50 | | | | | 3.00 |
| Triethylene glycol monobutyl ether (0.36) | | | | | | | | | | | |
| Triethylene glycol monoethyl ether (−0.66) | | | | | | | | | | | |
| Tripropylene glycol monobutyl ether (1.66) | | | | | | | | | | | |
| 2-Pyrrolidone (−1.09) | | | | | | | | | | | |
| Ethylene glycol (−1.36) | | | | | | | | | | | |
| 1,2,6-Hexanetriol (−1.39) | | | | | | | | | | | |
| Glycerin (−1.85) | 15.00 | 15.00 | 15.00 | 15.00 | 15.00 | 15.00 | 18.00 | 15.00 | 15.00 | 15.00 | 15.00 |
| ACETYLENOL E60 | 0.60 | 0.60 | 0.60 | 0.60 | 0.60 | 0.60 | 0.60 | 0.60 | 0.60 | 0.60 | 0.60 |
| ACETYLENOL E100 | | | | | | | | | | | |
| Surfynol 104 | | | | | | | | | | | |
| Surfynol 82 | | | | | | | | | | | |
| Zonyl FS-3100 | | | | | | | | | | | |
| BYK-348 | | | | | | | | | | | |
| Ion-exchanged water | 31.40 | 31.40 | 31.40 | 31.40 | 31.40 | 31.40 | 31.40 | 31.40 | 33.40 | 31.40 | 31.40 |
| Content (%) of pigment | 5.00 | 5.00 | 5.00 | 5.00 | 5.00 | 5.00 | 5.00 | 5.00 | 5.00 | 5.00 | 5.00 |
| Content (%) of first water-soluble organic solvent | 3.00 | 3.00 | 3.00 | 3.00 | 3.00 | 3.00 | 0.00 | 3.00 | 1.00 | 3.00 | 3.00 |
| Total content (%) of water-soluble organic solvents | 18.00 | 18.00 | 18.00 | 18.00 | 18.00 | 18.00 | 18.00 | 18.00 | 16.00 | 18.00 | 18.00 |
| Content (%) of surfactant | 0.60 | 0.60 | 0.60 | 0.60 | 0.60 | 0.60 | 0.60 | 0.60 | 0.60 | 0.60 | 0.60 |
| Content of surfactant/content of first water-soluble organic solvent (times) | 0.20 | 0.20 | 0.20 | 0.20 | 0.20 | 0.20 | — | 0.20 | 0.60 | 0.20 | 0.20 |
| Proportion (%) of first water-soluble organic solvent in all the water-soluble organic solvents | 16.67 | 16.67 | 16.67 | 16.67 | 16.67 | 16.67 | 0.00 | 16.67 | 6.25 | 16.67 | 16.67 |
| Content of first water-soluble organic solvent/content of pigment (times) | 0.60 | 0.60 | 0.60 | 0.60 | 0.60 | 0.60 | 0.00 | 0.60 | 0.20 | 0.60 | 0.60 |
| Content of surfactant/content of pigment (times) | 0.12 | 0.12 | 0.12 | 0.12 | 0.12 | 0.12 | 0.12 | 0.12 | 0.12 | 0.12 | 0.12 |

TABLE 3

Composition and properties of ink

| | Ink No. | | | | | | | | | |
|---|---|---|---|---|---|---|---|---|---|---|
| | 12 | 13 | 14 | 15 | 16 | 17 | 18 | 19 | 20 | 21 |
| Pigment dispersion liquid 1 | 50.00 | 50.00 | 50.00 | 50.00 | 50.00 | 50.00 | 50.00 | 50.00 | 50.00 | 50.00 |
| Pigment dispersion liquid 2 | | | | | | | | | | |
| Pigment dispersion liquid 3 | | | | | | | | | | |
| Pigment dispersion liquid 4 | | | | | | | | | | |
| Pigment dispersion liquid 5 | | | | | | | | | | |
| 1,2-Hexanediol (0.52) | | | | | 3.00 | 3.00 | 3.00 | 3.00 | 3.00 | 3.00 |
| 1,3-Propanediol (−1.09) | | | | | | | | | | |
| 1,2-Octanediol (1.54) | | | | | | | | | | |
| 3-Methyl-1,5-pentanediol (−0.21) | | | | | | | | | | |
| Ethylene glycol monobutyl ether (0.83) | | | | | | | | | | |
| Triethylene glycol monobutyl ether (0.36) | 3.00 | | | | | | | | | |
| Triethylene glycol monoethyl ether (−0.66) | | 3.00 | | | | | | | | |
| Tripropylene glycol monobutyl ether (1.66) | | | 3.00 | | | | | | | |
| 2-Pyrrolidone (−1.09) | | | | 3.00 | | | | | | |
| Ethylene glycol (−1.36) | | | | | | | | | | |
| 1,2,6-Hexanetriol (−1.39) | | | | | | | | | | |
| Glycerin (−1.85) | 15.00 | 15.00 | 15.00 | 15.00 | 15.00 | 15.00 | 15.00 | 15.00 | 15.00 | 15.00 |
| ACETYLENOL E60 | 0.60 | 0.60 | 0.60 | 0.60 | 0.30 | | | | | |
| ACETYLENOL E100 | | | | | | 0.60 | | | | |
| Surfynol 104 | | | | | 0.30 | | 0.60 | | | |
| Surfynol 82 | | | | | | | | 0.60 | | |
| Zonyl FS-3100 | | | | | | | | | 0.60 | |
| BYK-348 | | | | | | | | | | 0.60 |
| Ion-exchanged water | 31.40 | 31.40 | 31.40 | 31.40 | 31.40 | 31.40 | 31.40 | 31.40 | 31.40 | 31.40 |
| Content (%) of pigment | 5.00 | 5.00 | 5.00 | 5.00 | 5.00 | 5.00 | 5.00 | 5.00 | 5.00 | 5.00 |
| Content (%) of first water-soluble organic solvent | 3.00 | 3.00 | 3.00 | 3.00 | 3.00 | 3.00 | 3.00 | 3.00 | 3.00 | 3.00 |
| Total content (%) of water-soluble organic solvents | 18.00 | 18.00 | 18.00 | 18.00 | 18.00 | 18.00 | 18.00 | 18.00 | 18.00 | 18.00 |
| Content (%) of surfactant | 0.60 | 0.60 | 0.60 | 0.60 | 0.60 | 0.60 | 0.60 | 0.60 | 0.60 | 0.60 |
| Content of surfactant/content of first water-soluble organic solvent (times) | 0.20 | 0.20 | 0.20 | 0.20 | 0.20 | 0.20 | 0.20 | 0.20 | 0.20 | 0.20 |
| Proportion (%) of first water-soluble organic solvent in all the water-soluble organic solvents | 16.67 | 16.67 | 16.67 | 16.67 | 16.67 | 16.67 | 16.67 | 16.67 | 16.67 | 16.67 |
| Content of first water-soluble organic solvent/content of pigment (times) | 0.60 | 0.60 | 0.60 | 0.60 | 0.60 | 0.60 | 0.60 | 0.60 | 0.60 | 0.60 |
| Content of surfactant/content of pigment (times) | 0.12 | 0.12 | 0.12 | 0.12 | 0.12 | 0.12 | 0.12 | 0.12 | 0.12 | 0.12 |

TABLE 4

Composition and properties of ink

| | Ink No. | | | | | | | | | |
|---|---|---|---|---|---|---|---|---|---|---|
| | 22 | 23 | 24 | 25 | 26 | 27 | 28 | 29 | 30 | 31 |
| Pigment dispersion liquid 1 | 50.00 | 50.00 | 50.00 | 50.00 | 50.00 | 50.00 | 50.00 | | 50.00 | 50.00 | 50.00 |
| Pigment dispersion liquid 2 | | | | | | | | | | |
| Pigment dispersion liquid 3 | | | | | | | | | | |
| Pigment dispersion liquid 4 | | | | | | | | | | |
| Pigment dispersion liquid 5 | | | | | | | | | | |
| 1,2-Hexanediol (0.52) | 0.40 | 0.50 | 15.00 | 15.30 | 3.00 | 3.00 | | 3.00 | | |
| 1,3-Propanediol (−1.09) | | | | | | | | | | |
| 1,2-Octanediol (1.54) | | | | | | | | | | |
| 3-Methyl-1,5-pentanediol (−0.21) | | | | | | | | | | |
| Ethylene glycol monobutyl ether (0.83) | | | | | | | | | | |
| Triethylene glycol monobutyl ether (0.36) | | | | | | | | | | |
| Triethylene glycol monoethyl ether (−0.66) | | | | | | | | | | |
| Tripropylene glycol monobutyl ether (1.66) | | | | | | | | | | |
| 2-Pyrrolidone (−1.09) | | | | | | | 0.40 | | | |
| Ethylene glycol (−1.36) | | | | | | | | | 3.00 | |
| 1,2,6-Hexanetriol (−1.39) | | | | | | | | | | 3.00 |
| Glycerin (−1.85) | 15.00 | 15.00 | 15.00 | 15.00 | 15.00 | 15.00 | 15.00 | 15.00 | 15.00 | 15.00 |
| ACETYLENOL E60 | 0.60 | 0.60 | 0.60 | 0.60 | 0.10 | 0.07 | | | 0.60 | 0.60 |
| ACETYLENOL E100 | | | | | | | | | | |
| Surfynol 104 | | | | | | | | | | |
| Surfynol 82 | | | | | | | | | | |
| Zonyl FS-3100 | | | | | | | 0.008 | | | |
| BYK-348 | | | | | | | | | | |
| Ion-exchanged water | 34.00 | 33.90 | 19.40 | 19.10 | 31.90 | 31.93 | 34.59 | 32.00 | 31.40 | 31.40 |
| Content (%) of pigment | 5.00 | 5.00 | 5.00 | 5.00 | 5.00 | 5.00 | 5.00 | 5.00 | 5.00 | 5.00 |
| Content (%) of first water-soluble organic solvent | 0.40 | 0.50 | 15.00 | 15.30 | 3.00 | 3.00 | 0.40 | 3.00 | 0.00 | 0.00 |
| Total content (%) of water-soluble organic solvents | 15.40 | 15.50 | 30.00 | 30.30 | 18.00 | 18.00 | 15.40 | 18.00 | 18.00 | 18.00 |

TABLE 4-continued

Composition and properties of ink

| | Ink No. | | | | | | | | | |
|---|---|---|---|---|---|---|---|---|---|---|
| | 22 | 23 | 24 | 25 | 26 | 27 | 28 | 29 | 30 | 31 |
| Content (%) of surfactant | 0.60 | 0.60 | 0.60 | 0.60 | 0.10 | 0.07 | 0.008 | 0.00 | 0.60 | 0.60 |
| Content of surfactant/content of first water-soluble organic solvent (times) | 1.50 | 1.20 | 0.04 | 0.04 | 0.03 | 0.02 | 0.02 | 0.00 | — | — |
| Proportion (%) of first water-soluble organic solvent in all the water-soluble organic solvents | 2.60 | 3.23 | 50.00 | 50.50 | 16.67 | 16.67 | 2.60 | 16.67 | 0.00 | 0.00 |
| Content of first water-soluble organic solvent/content of pigment (times) | 0.08 | 0.10 | 3.00 | 3.06 | 0.60 | 0.60 | 0.08 | 0.60 | 0.00 | 0.00 |
| Content of surfactant/content of pigment (times) | 0.12 | 0.12 | 0.12 | 0.12 | 0.02 | 0.01 | 0.00 | 0.00 | 0.12 | 0.12 |

<Evaluation>

Each ink was filled in a main tank 1 of an inkjet recording apparatus having a main section illustrated in FIGURE. The volume of the main tank was 200 g, and the volume excluding the volume of the main tank was 145 g. The ink was concentrated for a certain period of time by circulating the ink at a rate (flow rate) of 5 mL/min using a circulation pump 4 illustrated in FIGURE. Respective concentrated inks are denoted as the first inks 1 to 31. In Reference Examples 3 and 4, the circulation pump 4 was not used, and therefore the first ink 30 and the first ink 1 were not concentrated.

The difference in the content of water between the first ink and the second ink was calculated in the following manner. The content of water in the first ink taken out of the recording head and the content of water in the second ink taken out of the main tank were measured using a Karl Fischer moisture titrator (MKC-510, manufactured by Kyoto Electronics Manufacturing Co., Ltd.). On that occasion, as a titrant, HYDRANAL-Composite 534805-1L-R was used. The difference in the content of water between the first ink and the second ink was calculated from the values of the content of water in each ink of the first ink and the second ink.

In the present invention, A or B denotes an acceptable level, and C denotes an unacceptable level. Evaluation results are described in Table 5. It is to be noted that both of Example 1 and Reference Example 4, in which the ink composition is the same but whether the ink was circulated or not is different, were rated as rank A in image density unevenness. However, when an evaluation of removing a stuck ink by sucking the ink from clogged ejection orifices was conducted after the recording head was left to stand for several months, Example 1 in which the ink was circulated exhibited a relatively more favorable result than Reference Example 4 in which the ink was not circulated.

(Image Density Unevenness)

As the recording head, a line head obtained by arranging in a staggered manner recording element substrates each having a number of nozzles of 1024, a nozzle density per nozzle array of 600 dpi and an amount of ejection of the ink per nozzle of 5 ng was used. After the ink was circulated till the difference in the content of water between the first ink and the second ink reached the value described in Table 5, the second ink which was not concentrated was filled in the main tank. Thereafter, a solid image was recorded on the whole surface of one sheet of A4-sized recording medium under the condition of imparting three ink droplets to a unit area of 1/600 inches×1/600 inches. As the recording medium, plain paper (high-quality exclusive paper HR-101S, manufactured by Canon Inc.) was used. The solid image was checked by visual observation or observation with a loupe to evaluate the image density unevenness according to the following evaluation criteria.

A: Image density unevenness is not confirmed by both visual observation and observation with a loupe enlarging the solid image 10 times B: Image density unevenness is not confirmed by visual observation but is confirmed by observation with a loupe enlarging the solid image 10 times C: Image density unevenness is confirmed by visual observation.

TABLE 5

Evaluation conditions and evaluation results

| | First ink No. | Second ink No. | Content (%) of water in first ink | Content (%) of water in second ink | Difference in content of water between first ink and second ink (&) | Circulation | Density Unevenness |
|---|---|---|---|---|---|---|---|
| Example 1 | 1 | 1 | 28.40 | 31.40 | 3.00 | Circulated | A |
| Example 2 | 2 | 2 | 28.40 | 31.40 | 3.00 | Circulated | A |
| Example 3 | 3 | 3 | 28.40 | 31.40 | 3.00 | Circulated | A |
| Example 4 | 4 | 4 | 28.40 | 31.40 | 3.00 | Circulated | A |
| Example 5 | 5 | 5 | 28.40 | 31.40 | 3.00 | Circulated | A |
| Example 6 | 1 | 1 | 29.40 | 31.40 | 2.00 | Circulated | A |
| Example 7 | 1 | 1 | 25.40 | 31.40 | 6.00 | Circulated | A |
| Example 8 | 6 | 6 | 28.40 | 31.40 | 3.00 | Circulated | A |
| Example 9 | 7 | 1 | 28.40 | 31.40 | 3.00 | Circulated | B |
| Example 10 | 8 | 8 | 28.40 | 31.40 | 3.00 | Circulated | A |
| Example 11 | 9 | 9 | 30.40 | 33.40 | 3.00 | Circulated | A |
| Example 12 | 10 | 10 | 28.40 | 31.40 | 3.00 | Circulated | A |
| Example 13 | 11 | 11 | 28.40 | 31.40 | 3.00 | Circulated | A |
| Example 14 | 12 | 12 | 28.40 | 31.40 | 3.00 | Circulated | A |

TABLE 5-continued

Evaluation conditions and evaluation results

| | First ink No. | Second ink No. | Content (%) of water in first ink | Content (%) of water in second ink | Difference in content of water between first ink and second ink (&) | Circulation | Density Unevenness |
|---|---|---|---|---|---|---|---|
| Example 15 | 13 | 13 | 28.40 | 31.40 | 3.00 | Circulated | A |
| Example 16 | 14 | 14 | 28.40 | 31.40 | 3.00 | Circulated | A |
| Example 17 | 15 | 15 | 28.40 | 31.40 | 3.00 | Circulated | B |
| Example 18 | 16 | 16 | 28.40 | 31.40 | 3.00 | Circulated | A |
| Example 19 | 17 | 17 | 28.40 | 31.40 | 3.00 | Circulated | A |
| Example 20 | 18 | 18 | 28.40 | 31.40 | 3.00 | Circulated | A |
| Example 21 | 19 | 19 | 28.40 | 31.40 | 3.00 | Circulated | A |
| Example 22 | 20 | 20 | 28.40 | 31.40 | 3.00 | Circulated | B |
| Example 23 | 21 | 21 | 28.40 | 31.40 | 3.00 | Circulated | B |
| Example 24 | 22 | 22 | 31.00 | 34.00 | 3.00 | Circulated | B |
| Example 25 | 23 | 23 | 30.90 | 33.90 | 3.00 | Circulated | A |
| Example 26 | 24 | 24 | 16.40 | 19.40 | 3.00 | Circulated | A |
| Example 27 | 25 | 25 | 16.10 | 19.10 | 3.00 | Circulated | B |
| Example 28 | 26 | 26 | 28.90 | 31.90 | 3.00 | Circulated | A |
| Example 29 | 27 | 27 | 28.93 | 31.93 | 3.00 | Circulated | B |
| Example 30 | 28 | 28 | 31.59 | 34.59 | 3.00 | Circulated | B |
| Comparative Example 1 | 29 | 29 | 29.00 | 32.00 | 3.00 | Circulated | C |
| Comparative Example 2 | 30 | 30 | 28.40 | 31.40 | 3.00 | Circulated | C |
| Comparative Example 3 | 31 | 31 | 28.40 | 31.40 | 3.00 | Circulated | C |
| Reference Example 1 | 30 | 30 | 30.40 | 31.40 | 1.00 | Circulated | A |
| Reference Example 2 | 1 | 1 | 30.40 | 31.40 | 1.00 | Circulated | A |
| Reference Example 3 | 30 | 30 | 31.40 | 31.40 | 0.00 | Not Circulated | A |
| Reference Example 4 | 1 | 1 | 31.40 | 31.40 | 0.00 | Not Circulated | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-015198, filed Jan. 31, 2018, which is hereby incorporated by reference herein in its entirety.

What is claimed is:

1. An inkjet recording method comprising:
   preparing a first ink and a second ink;
   ejecting an aqueous ink using an inkjet recording apparatus comprising an ink circulation channel in which the first ink circulates, an ink supply channel supplying the second ink into the ink circulation channel, and a recording head communicating with the ink circulation channel, the inkjet recording apparatus being configured to eject the aqueous ink comprising the first ink and the second ink from the recording head; and
   recording an image on a recording medium,
   wherein a difference between a content (% by mass) of water in the first ink and a content (% by mass) of water in the second ink is 2.00% by mass or more,
   wherein the first ink comprises a pigment,
   wherein the second ink comprises a first water-soluble organic solvent having a log P value of −1.10 or more and a surfactant, and
   wherein a flow speed of the first ink in the ink circulation channel is set to 1 to 10 mL/min.

2. The inkjet recording method according to claim 1, wherein the first ink is a concentrated ink having a lower content of water than the second ink.

3. The inkjet recording method according to claim 1, wherein the first water-soluble organic solvent is at least one selected from the group consisting of an alkane diol and a glycol ether.

4. The inkjet recording method according to claim 1, wherein the surfactant is a compound represented by the following formula (1):

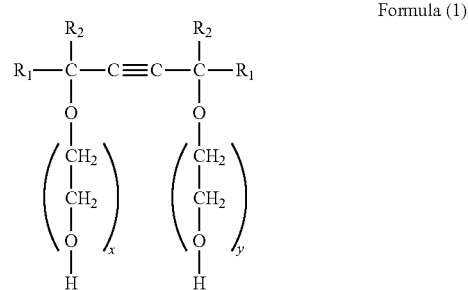

Formula (1)

wherein $R_1$ and $R_2$ each independently represent an alkyl group having 1 or more to 4 or less carbon atoms, and x+y is 0.0 or more to 10.0 or less.

5. The inkjet recording method according to claim 1, wherein a content (% by mass) of the first water-soluble organic solvent in the second ink is 0.50% by mass or more to 15.00% by mass or less based on a total mass of the ink.

6. The inkjet recording method according to claim 1, wherein a mass ratio (times) of a content (% by mass) of the surfactant in the second ink to a content (% by mass) of the first water-soluble organic solvent in the second ink is 0.03 times or more.

7. An inkjet recording apparatus comprising:
a first ink;
a second ink;
an ink circulation channel for circulating the first ink;
an ink supply channel for supplying the second ink into the ink circulation channel; and
a recording head communicating with the ink circulation channel,
wherein the apparatus is configured to eject an aqueous ink comprising the first ink and the second ink from the recording head,
wherein a difference between a content (% by mass) of water in the first ink and a content (% by mass) of water in the second ink is 2.00% by mass or more,
wherein the first ink comprises a pigment,
wherein the second ink comprises a first water-soluble organic solvent having a log P value of −1.10 or more and a surfactant, and
wherein a flow speed of the first ink in the ink circulation channel is set to 1 to 10 mL/min.

8. The inkjet recording method according to claim 1, wherein the content (% by mass) of water in the first ink is smaller than the content (% by mass) of water in the second ink.

9. The inkjet recording method according to claim 1, wherein the content of the pigment in the second ink is 0.10% by mass or more to 15.00% by mass or less based on the total mass of the ink.

10. The inkjet recording method according to claim 1, wherein the pigment is dispersed by a resin dispersant in the first ink.

11. The inkjet recording method according to claim 1, wherein the first water-soluble organic solvent is an alkane diol having 8 or less carbon atoms.

12. The inkjet recording method according to claim 1, wherein the first water-soluble organic solvent is a glycol ether represented by $R_3$—$(OR_4)_n$—OH, wherein $R_3$ represents an alkyl group having 2 or more to 4 or less carbon atoms, $R_4$ represents an alkylene group having 2 or 3 carbon atoms and n represents 1 or more to 3 or less.

13. The inkjet recording method according to claim 1, wherein the surfactant is an acetylene glycol-based nonionic surfactant.

14. The inkjet recording method according to claim 1, wherein the content (% by mass) of the surfactant in the second ink is 0.10% by mass or more to 1.00% by mass or less based on the total mass of the ink.

15. The inkjet recording method according to claim 1, wherein the recording head is a line head.

16. The inkjet recording method according to claim 1, wherein the second ink comprises a pigment.

* * * * *